2,539,802

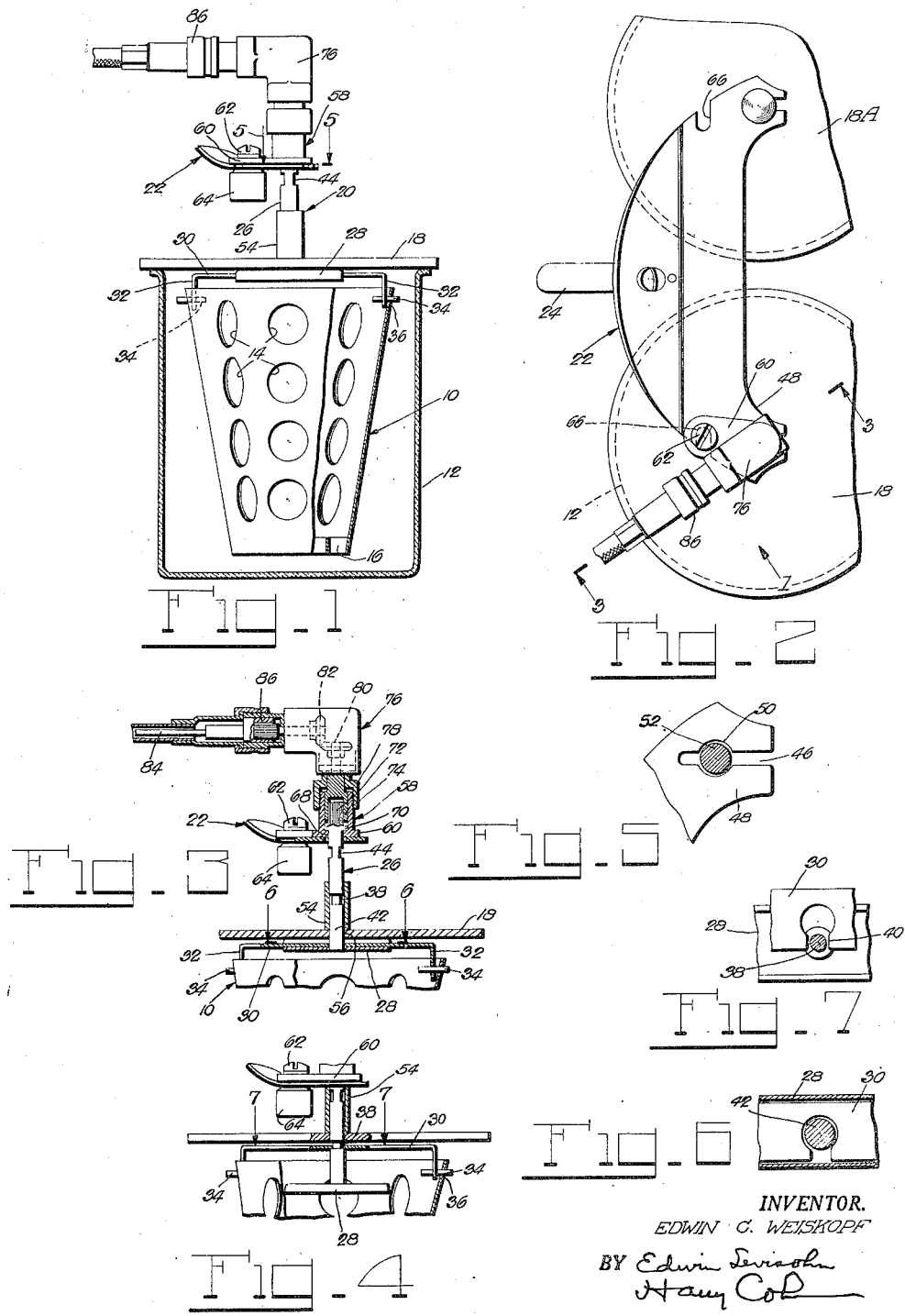
Jan. 30, 1951  E. C. WEISKOPF  2,539,802
MATERIAL-HOLDER CARRIER FOR AUTOMATIC
IMMERSION APPARATUS
Filed March 15, 1949
INVENTOR.
EDWIN C. WEISKOPF
ATTORNEYS Patented Jan. 30, 1951

UNITED STATES PATENT OFFICE 2,539,802

MATERIAL-HOLDER CARRIER FOR AUTOMATIC IMMERSION APPARATUS

Edwin C. Weiskopf, New York, N. Y.

Application March 15, 1949, Serial No. 81,472

13 Claims. (Cl. 91—60)

1

This invention relates to automatic immersion apparatus and more particularly to means for releasably supporting the material holder on the conveyor of such apparatus.

Automatic immersion apparatus of the type to which the present invention relates is shown in U. S. Patents Nos. 2,341,197 and 2,341,198 heretofore granted to me. In the operation of such apparatus a material holder is moved into and out of each of a plurality of receptacles, in succession, with intervening intervals during which said holder is positioned within the receptacles respectively for subjecting the material in the holder to the action of various liquids provided in said receptacle, and provision is made for turning or rotating the holder while in the receptacles in order to improve the action of the liquids on the material, as referred to in said patents.

One object of the present invention is to provide an improved carrier for the material holder constructed and arranged to enable the material holder to be readily attached to and removed from the carrier when desired.

Another object is to provide an improved carrier for the material holder for rotating or turning the latter in the liquid receptacles.

The above objects of the invention and other objects ancillary thereto will be fully understood from the following description considered in connection with the accompanying drawings, which are to be considered as illustrative of the invention but not in limitation thereof.

In the drawings:

Fig. 1 is a side view of the carrier for the material holder, the latter being shown partly in section and the receptacle in which the holder is inserted being shown in section;

Fig. 2 is a top plan view of the carrier and part of the conveyor;

Fig. 3 is a sectional view on the line 3—3 of Fig. 2;

Fig. 4 is a sectional view, similar to Fig. 3, illustrating in conjunction with Figs. 6 and 7 the manner of releasably attaching the holder to the carrier;

Fig. 5 is a detail sectional view on the line 5—5 of Fig. 1;

Fig. 6 is a sectional view on the line 6—6 of Fig. 3;

Fig. 7 is a sectional view on the line 7—7 of Fig. 4.

In Fig. 1, the material holder 10 is shown in position in a beaker or other liquid receptacle 12, said holder having a plurality of openings 14 therein, and being open at the bottom as indicated at 16 so that the liquid (not shown) in the receptacle freely enters said holder for treating the tissue or other material placed thereon. Said holder and a cover 18 are mounted on a carrier 20 which in turn is releasably secured to a bracket 22 forming part of the conveyor. Said bracket is fastened to a conveyor arm 24 which is raised and lowered by the machine, during the operation thereof, and which moves said bracket in an arcuate path, corresponding to the usual circular arrangement of the liquid receptacles as shown in said patents, for moving the material holder out of one receptacle and into the next receptacle. As here shown, bracket 22 also supports a cover 18A, for covering a receptacle next to the one in which the material holder 10 is inserted.

The carrier 20 includes a pin or spindle 26 having a channel-shaped supporting member 28 fixed thereto at its lower end. A material-holder supporting member 30 is mounted in member 28 and is supported and rotated thereby when pin or spindle 26 is rotated as will be subsequently described. Said member 30 has ear portions 32 provided with pin projections 34 which are releasably engageable in apertures 36 at the upper end of holder 10 for releasably securing said holder to said supporting member 30. Holder 10 is flexible so that it may be pressed into oval form or widened at its top in order to attach it to and remove it from pin projections 34. Spindle 26 has a reduced portion 38 which enables the supporting member 30 to be assembled with member 28 in the manner shown by Fig. 7. More particularly, it will be observed that member 30 has a slot with a narrow entrance part 40 which is wide enough to clear the smaller part 38 of pin or spindle 26 but which is too narrow to clear the larger part 42 of said spindle (Fig. 6). Also, pin 26 has a narrow part 44 to enable the pin to be moved into and out of the entrance opening 46 of a slot provided in an end portion 48 of bracket 22. Said slot in the bracket has an opening 50 to which slot 46 leads, said opening being large enough to receive the wider part 52 of spindle 26. A sleeve 54 is slidable on spindle 26 and, when provided for the purpose hereinafter explained, must be moved upwardly on said spindle clear of the narrow part 38 of the latter in order to enable supporting member 30 to be assembled with and disassembled from the companion supporting member 28 of the holder carrier, in a manner which will be obvious from an inspection of Figs. 4 and 7. It will be noted that spindle 26 projects through a central opening 56 provided in cover 18 and that said cover rests on the top of a receptacle 12. Said cover 18 and spindle 26 are relatively movable longitudinally of said spindle. Accordingly it will be understood that spindle 26 may move downwardly, if necessary, after cover 18 engages the top of the receptacle without pressing said cover against the receptacle. It may be noted however that in the operation of the machine the downward movement of spindle 26 after the cover 18 engages the top of the receptacle is ordinarily comparatively small.

As indicated in my abovementioned patents provision is made for turning holder 10 about a vertical axis by the rotating means provided with the apparatus shown by said patents. Pursuant to the present invention, rotation of the holder 10 is accomplished by providing mechanism for rotating pin 26 which thereby rotates member 28 and holder supporting member 30 when said two members are interfitted as above described and as shown by Figs. 1, 3 and 6. When so interfitted, the rotation of member 28 by spindle 26 causes rotation of the holder-supporting member 30 as will be readily obvious. A fitting 58 is provided for attaching spindle 26 to bracket 22 in such manner as to hold said spindle in position axially of holder 10 and yet to enable the required vertical and rotary movement of said spindle. Fitting 58 includes an arm 60, a screw 62 and a companion clamping nut 64 for releasably securing said fitting to the bracket. In this connection it will be observed that at each end of the bracket there is an open-end slot 66 to receive the shank of screw 62. It will be understood that when clamping nut 64 is tightened against the adjacent lower surface portion of bracket 22 around the slot 66 in which screw 62 is inserted, fitting 58 is tightly but releasably secured to said bracket. Fig. 2 also shows a slot 66 at the end of the bracket opposite that to which the carrier 20 is secured so that said carrier may be attached to either end of the bracket, as may be desired. The upper end of spindle 26 has a limited sliding fit in an opening 68 in the lower end of fitting 58, and a shoulder 70 is provided on said spindle to limit the downward movement of the latter in relation to fitting 58. Said spindle 26 has a gear portion 72 which meshes with and is rotated by an internal gear 74. The latter is part of a transmission fitting or coupling 76 which includes the coupling nut 78 threaded on fitting 58. Bevel gears 80 and 82 are mounted in coupling fitting 76 and are operated by a flexible drive shaft 84 connected to gear 82 by the transmission gear coupling 86. Shaft 84 may be connected to any suitable source of power for operating the latter whereby to rotate spindle 26.

When the apparatus is used for staining slides, a slide holder such as that shown in my co-pending application Ser. No. 769,897, filed August 21, 1947, now Patent No. 2,522,416, is used instead of holder 10, said slide holder having provision for attaching the same to the pin projection 34 of holder support 32. When carrier 20 is used for rotating such slide holder, the above mentioned sleeve 54 has the function of limiting the downward movement of the slide holder in the receptacle when spindle 26 is disconnected from bracket 22. In this connection it will be understood that cover 18 being supported on top of receptacle 12 the upper end of said sleeve engages the lower surface of arm 60 when fitting 58 is removed from bracket 22, thus preventing downward movement of spindle 26 and preventing the downward movement of the slide holder in the receptacle beyond the extent desired. Accordingly, should a technician or other individual wish to remove a receptacle 12 in which the slide holder is positioned, without removing the slide holder, he can do so by disconnecting nut 78 and by unclamping nut 64, and after the receptacle with the slide holder attached to the carrier 26 is removed from its support on the apparatus, the slide holder would be supported on cover 18 and would not fall into the receptacle.

It will be understood that various changes in the details of construction and in the form and arrangement of parts may be made without departing from the underlying idea or principles of this invention within the scope of the appended claims.

Having thus described my invention, what I claim and desire to secure by Letters Patent, is:

1. A carrier for a material holder, comprising a spindle, a part carried by said spindle and extending transversely of the axis thereof, and a supporting member for the material holder removably mountable on said transverse part, said spindle having a reduced portion spaced from said transversely extending part and said supporting member having an opening for the projection of said spindle therethrough and having a slot narrower than said opening extending therefrom, and terminating in an open end, said slot being wide enough to receive said reduced portion of the spindle to effect said removable mounting of said supporting member on said transverse part but too narrow to receive the part of the spindle between said transversely extending part and said reduced portion of the spindle, whereby said supporting member is held against removal from said spindle when mounted on said transverse part and is removable from the latter and from the spindle at said reduced portion of said spindle.

2. A carrier as defined by claim 1, further characterized in that said transversely extending part and said supporting member have interengaging portions to hold said supporting member in position on said transversely extending part, said interengaging portions being free of mutual securement.

3. A carrier as defined by claim 1, further characterized in that said transversely extending part is U-shaped and said supporting member removably fits therein and is thereby held in position thereon.

4. A carrier as defined by claim 1, wherein said spindle is rotatable and said transversely extending part is rotatable with said spindle, and said transversely extending part and said supporting member have interengaging portions to hold said supporting member in position on said transversely extending part for rotation therewith, said interengaging portions being free of mutual securement.

5. A carrier for a material holder, comprising a spindle, a part carried by said spindle and extending transversely of the axis thereof, and a supporting member for the material holder removably mountable on said transverse part, said spindle having a reduced portion spaced from said transversely extending part and said supporting member having an opening for the projection of said spindle therethrough and having a slot narrower than said opening extending therefrom, and terminating in an open end, said slot being wide enough to receive said reduced portion of the spindle to effect said removable mounting of said supporting member on said transverse part but too narrow to receive the part of the spindle between said transversely extending part and said reduced portion of the spindle, whereby said supporting member is held against removal from said spindle when mounted on said transverse part and is removable from the latter and from the spindle at said reduced portion of said spindle, means for supporting said spindle for turning movement, and mechanism mounted on said last mentioned means for turning said spindle.

6. A carrier for a material-holder, comprising a spindle having relatively wide and narrow portions, a holder support directly engageable with said material-holder and provided with an opening for the wider portion of said spindle, and having an open-end slot leading from said opening, said slot being wide enough to receive said narrow portion of the spindle but too narrow to receive said wide portion of the spindle, whereby said support must be positioned at said narrow portion of the spindle in order to mount the support on and remove it from said spindle, and means on said spindle and movable therewith for supporting said holder support when the latter is mounted in position on said spindle.

7. A carrier for a material-holder, comprising a spindle having relatively wide and narrow portions, a holder support directly engageable with said material-holder and provided with an opening for the wider portion of said spindle, and having an open-end slot leading from said opening, said slot being wide enough to receive said narrow portion of the spindle but too narrow to receive said wide portion of the spindle, whereby said support must be positioned at said narrow portion of the spindle in order to mount the support on and remove it from said spindle, and means on said spindle and movable therewith for supporting said holder support when the latter is mounted in position on said spindle, said spindle being mounted for turning movement about its axis and said last mentioned means and said holder support having interengaging parts thereof engageable with each other for turning said holder support by said spindle, said interengaging parts being free of mutual securement.

8. A carrier for a material-holder, comprising a spindle having relatively wide and narrow portions, a holder support directly engageable with said material-holder and provided with an opening for the wider portion of said spindle, and having an open-end slot leading from said opening, said slot being wide enough to receive said narrow portion of the spindle but too narrow to receive said wide portion of the spindle, whereby said support must be positioned at said narrow portion of the spindle in order to mount the support on and remove it from said spindle, and means on said spindle and movable therewith for supporting said holder support when the latter is mounted in position on said spindle, said spindle being mounted for turning movement about its axis and said last mentioned means comprising a U-shaped member in which said holder support removably fits whereby turning of said spindle causes turning of said holder support.

9. A carrier for a material-holder for use in automatic immersion apparatus wherein a conveyor is provided for raising, laterally moving, and lowering the carrier, said carrier comprising a fitting provided with means for releasably securing it to said conveyor, a rotary gear in said fitting, a spindle mounted for rotation in said fitting and having a gear portion meshing with said rotary gear of said fitting, a supporting member carried by said spindle for supporting and turning said material holder, and a transmission fitting removably secured to said first mentioned fitting, said rotary gear being operatively carried in said transmission fitting and extending into said first mentioned fitting for operating said gear portion.

10. A carrier for a material-holder for use in automatic immersion apparatus wherein a conveyor is provided for raising, laterally moving, and lowering the carrier, said carrier comprising a fitting provided with means for releasably securing it to said conveyor, a rotary gear in said fitting, a spindle mounted for rotation in said fitting and having a gear portion meshing with said rotary gear of said fitting, a supporting member carried by said spindle for supporting and turning said material holder, and a transmission fitting removably secured to said first mentioned fitting, said rotary gear being operatively carried in said transmission fitting and extending into said first mentioned fitting for operating said gear portion and driven means extending into said transmission fitting operatively connected to said gear for turning the latter.

11. A carrier for a material-holder for use in automatic immersion apparatus wherein a conveyor is provided for raising, laterally moving, and lowering the carrier, said conveyor having a part provided with a plurality of laterally spaced open-end slots, said carrier comprising a fitting carried by said conveyor part and having means releasably engageable in one of said slots for releasably securing said fitting in position, a spindle spaced laterally of said last mentioned means mounted for turning movement in said fitting and extending through said other slot, and means in said fitting for turning said spindle, said spindle having a part adapted to support and turn said material-holder.

12. A carrier for a material-holder for use in automatic immersion apparatus wherein a conveyor is provided for raising, laterally moving, and lowering the carrier, said conveyor having a part provided with a plurality of laterally spaced open-end slots, said carrier comprising a fitting carried by said conveyor part and having means releasably engageable in one of said slots for releasably securing said fitting in position, a spindle spaced laterally of said last mentioned means mounted for turning movement in said fitting and extending through said other slot, and means in said fitting for turning said spindle, a transverse supporting member carried by said spindle, and a member removably mounted on said transverse member and attachable to a material-holder for supporting the latter from said transverse member, said last two mentioned members having longitudinally extending interengaging portions disposed transversely of the spindle axis whereby turning of the spindle causes turning of the material holder.

13. A carrier for a material-holder for use in automatic immersion apparatus having a covered receptacle and wherein a conveyor is provided for raising, laterally moving, and lowering the carrier, said conveyor having a part provided with a plurality of slots, said carrier comprising a fitting carried by said conveyor part and having means releasably engageable in one of said slots for releasably securing said fitting in position, a spindle mounted for turning movement in said fitting and extending through said other slot, means in said fitting for turning said spindle, a part carried by said spindle for supporting and turning said material holder, the receptacle cover being apertured and said spindle being slidably movable therein, said cover being disposed between said spindle part and said fitting, and a slidable sleeve disposed on said spindle between said cover and said fitting, said sleeve engaging said fitting when the latter is removed from the conveyor thereby limiting the movement of said material-holder into the receptacle.

EDWIN C. WEISKOPF.

REFERENCES CITED

The following references are of record in the file of this patent:

UNITED STATES PATENTS

| Number | Name | Date |
| --- | --- | --- |
| 2,341,197 | Weiskopf | Feb. 8, 1944 |
| 2,341,198 | Weiskopf | Feb. 8, 1944 |